US012651447B1

(12) United States Patent
Chen et al.

(10) Patent No.: US 12,651,447 B1
(45) Date of Patent: Jun. 9, 2026

(54) OBJECT DETECTION BASED ON TEXT INPUT THAT INCLUDES BOTH TARGET OBJECT CLASSES AND TARGET VISUAL ATTRIBUTES

(71) Applicant: Deere & Company, Moline, IL (US)

(72) Inventors: Kezhen Chen, San Mateo, CA (US); Xiaoyuan Guo, Palo Alto, CA (US); Jie Yang, Sunnyvale, CA (US); Yueqi Li, San Jose, CA (US)

(73) Assignee: Deere & Company, Moline, IL (US)

( * ) Notice: Subject to any disclaimer, the term of this patent is extended or adjusted under 35 U.S.C. 154(b) by 501 days.

(21) Appl. No.: 18/143,952

(22) Filed: May 5, 2023

(51) Int. Cl.
| | |
|---|---|
| *G06V 10/40* | (2022.01) |
| *G06F 40/253* | (2020.01) |
| *G06F 40/284* | (2020.01) |
| *G06F 40/40* | (2020.01) |
| *G06V 10/54* | (2022.01) |
| *G06V 10/56* | (2022.01) |
| *G06V 10/764* | (2022.01) |
| *G06V 10/776* | (2022.01) |
| *G06V 10/80* | (2022.01) |

(Continued)

(52) U.S. Cl.
CPC .......... *G06V 10/811* (2022.01); *G06F 40/253* (2020.01); *G06F 40/284* (2020.01); *G06F 40/40* (2020.01); *G06V 10/764* (2022.01); *G06V 10/776* (2022.01); *G06V 20/70* (2022.01)

(58) Field of Classification Search
USPC ................. 128/920, 922–925; 382/100–105, 382/154–159; 701/1–68, 110–122, 701/400–539, 300–302; 704/1–275; 706/1–62, 900–903
See application file for complete search history.

(56) References Cited

U.S. PATENT DOCUMENTS

| | | | |
|---|---|---|---|
| 10,733,480 B2 * | 8/2020 | Kumar | ................... G06V 10/25 |
| 11,120,306 B2 * | 9/2021 | Desai | ........................ G06T 7/70 |
| 11,468,550 B2 | 10/2022 | Cohen et al. | |

(Continued)

OTHER PUBLICATIONS

Chang, C. et al. "LLM4TS: Aligning Pre-Trained LLMs as Data-Efficient Time-Series Forecasters." arXiv Preprint arXiv:2308.08469v5, Jan. 18, 2024, pp. 1-14.

(Continued)

*Primary Examiner* — Marcellus J Augustin

(74) *Attorney, Agent, or Firm* — Fenwick & West LLP

(57) ABSTRACT

Implementations improve object classification/detection by leveraging visual attributes. An image depicting instance(s) of object class(es) is obtained with a textual snippet that includes: noun(s) identifying target object class(es); and adjective(s) describing target visual attribute(s). The textual snippet may be encoded as text embedding(s) that represent target object class(es) and visual attribute(s) in a shared embedding space. The image may be processed using an image encoder to generate image encoder output tokens (IEOTs) that are used to generate object visual embedding(s) in the shared embedding space. The text embedding(s) and the object visual embeddings may be used to classify the IEOTs as depicting an instance of the target object class(es) having target visual attribute(s). The IEOTs may also be processed using a localization head to predict annotation(s) for the digital image.

20 Claims, 5 Drawing Sheets

(51) Int. Cl.
    G06V 20/68       (2022.01)
    G06V 20/70       (2022.01)

(56)            References Cited

U.S. PATENT DOCUMENTS

| | | |
|---|---|---|
| 2017/0147910 A1 | 5/2017 | Mao et al. |
| 2020/0134392 A1* | 4/2020 | Gui ............................ G06N 5/01 |
| 2021/0004589 A1* | 1/2021 | Turkelson ............ G06V 10/809 |
| 2021/0027471 A1* | 1/2021 | Cohen ................. G06N 3/0442 |
| 2022/0058432 A1 | 2/2022 | Savvides et al. |
| 2022/0231979 A1* | 7/2022 | Back ....................... H04L 51/10 |
| 2023/0360365 A1* | 11/2023 | Minderer ............... G06V 10/82 |

OTHER PUBLICATIONS

Cleveland, R. B. et al. "STL: A Seasonal-Trend Decomposition Procedure Based on Loess." Journal of Official Statistics, vol. 6, No. 1, Mar. 1990, pp. 3-33.
Dong, E. et al. "An Interactive Web-Based Dashboard to track COVID-19 in Real Time." The Lancet: Infectious Diseases, vol. 20, No. 5, May 2020, pp. 533-534.
Godahewa, R. W. et al. "Monash Time Series Forecasting Archive." 35th Conference on Neural Information Processing Systems (NeurIPS 2021) Track on Datasets and Benchmarks, Oct. 11, 2021, pp. 1-14.
Hamilton, J. D. "State-Space Models." Handbook of Econometric, Chapter 50, vol. 4, Dec. 1994, pp. 3039-3080.
Jean-Michel D. "Smart Meters in London (Part1)—Description and First Insights—Jean-Michel D." Medium, Jan. 27, 2018, 21 pages, [Online] [Retrieved Jan. 30, 2025], Retrieved from the Internet <URL:https://medium.com/@boitemailjeanmid/smart-meters-in-london-part1-description-and-first-insights-jean-michel-d-db97af2de71b>.
Lai, G. et al. "Modeling Long- and Short-Term Temporal Patterns with Deep Neural Networks." arXiv Preprint arXiv:1703.07015v3, Apr. 18, 2018, pp. 1-11.
Li, C. et al. "LLaVA-Med: Training a Large Language-and-Vision Assistant for Biomedicine in One Day." arXiv Preprint arXiv:2306.00890v1, Jun. 1, 2023, pp. 1-17.
Liu, H. et al. "Visual Instruction Tuning." 37th Conference on Neural Information Processing Systems (NeurIPS 2023), Sep. 21, 2023, pp. 1-25.
Wang, Z. et al. "FinVis-GPT: A Multimodal Large Language Model for Financial Chart Analysis." arXiv Preprint arXiv:2308.01430v1, Jul. 31, 2023, pp. 1-7.
Xue, H. et al. "PromptCast: A New Prompt-Based Learning Paradigm for Time Series Forecasting." arXiv Preprint arXiv:2210.08964v5, Dec. 10, 2023, pp. 1-18.
Yu, X. et al. "Temporal Data Meets LLM-Explainable Financial Time Series Forecasting." arXiv Preprint arXiv:2306.11025v1, Jun. 19, 2023, pp. 1-13.
Zhang, Y. et al. "Insight Miner: A Time Series Analysis Dataset for Cross-Domain Alignment with Natural Language." NeurIPS 2023 AI for Science Workshop, Oct. 27, 2023, pp. 1-10.
Zhou, T. et al. "One Fits All: Power General Time Series Analysis by Pretrained LM." arXiv Preprint arXiv:2302.11939v6, Oct. 15, 2023, pp. 1-34.
Chia et al., "Contrastive language and vision learning of general fashion concepts" 11 pages.
Wang et al., "Detecting Everything in the Open World: Towards Universal Object Detection" arXiv:2303.11749v2 [cs.CV] 11 pages, dated Mar. 27, 2023.
Lin et al., "Learning Object-Language Alignments for Open-Vocabulary Object Detection" arXiv:2211.14843v1 [cs.CV] 16 pages, dated Nov. 27, 2022.
Radford et al., "Learning Transferable Visual Models From Natural Language Supervision" arXiv:2103.00020v1 [cs.CV] 48 pages, dated Feb. 26, 2021.
Marin et al. "Token Pooling in Vision Transformers" arXiv:2110.03860v2 [cs.CV] 21 pages, dated Oct. 11, 2021.
Parisot et al., "Learning to Name Classes for Vision and Language Models" arXiv:2304.01830v1 [cs.CV] 16 pages, dated Apr. 4, 2023.
Mensch et al., "Three ways to improve feature alignment for open vocabulary detection" arXiv:2303.13518v1 [cs.CV] 18 pages, dated Mar. 23, 2023.
Minderer et al., Simple Open-Vocabulary Object Detection with Vision Transformers 28 pages.

\* cited by examiner

400    Fig. 4

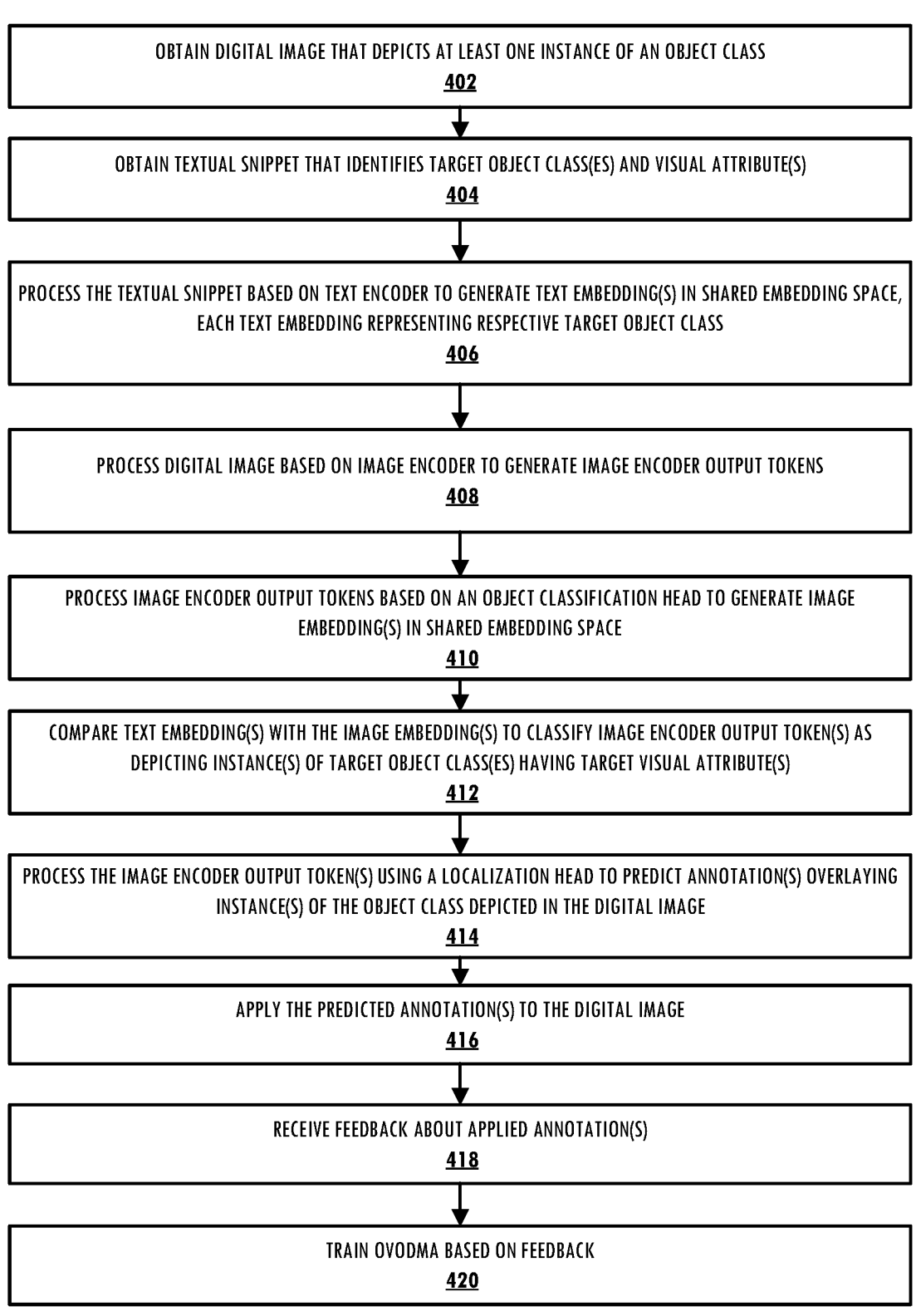

OBTAIN DIGITAL IMAGE THAT DEPICTS AT LEAST ONE INSTANCE OF AN OBJECT CLASS
402

OBTAIN TEXTUAL SNIPPET THAT IDENTIFIES TARGET OBJECT CLASS(ES) AND VISUAL ATTRIBUTE(S)
404

PROCESS THE TEXTUAL SNIPPET BASED ON TEXT ENCODER TO GENERATE TEXT EMBEDDING(S) IN SHARED EMBEDDING SPACE, EACH TEXT EMBEDDING REPRESENTING RESPECTIVE TARGET OBJECT CLASS
406

PROCESS DIGITAL IMAGE BASED ON IMAGE ENCODER TO GENERATE IMAGE ENCODER OUTPUT TOKENS
408

PROCESS IMAGE ENCODER OUTPUT TOKENS BASED ON AN OBJECT CLASSIFICATION HEAD TO GENERATE IMAGE EMBEDDING(S) IN SHARED EMBEDDING SPACE
410

COMPARE TEXT EMBEDDING(S) WITH THE IMAGE EMBEDDING(S) TO CLASSIFY IMAGE ENCODER OUTPUT TOKEN(S) AS DEPICTING INSTANCE(S) OF TARGET OBJECT CLASS(ES) HAVING TARGET VISUAL ATTRIBUTE(S)
412

PROCESS THE IMAGE ENCODER OUTPUT TOKEN(S) USING A LOCALIZATION HEAD TO PREDICT ANNOTATION(S) OVERLAYING INSTANCE(S) OF THE OBJECT CLASS DEPICTED IN THE DIGITAL IMAGE
414

APPLY THE PREDICTED ANNOTATION(S) TO THE DIGITAL IMAGE
416

RECEIVE FEEDBACK ABOUT APPLIED ANNOTATION(S)
418

TRAIN OVODMA BASED ON FEEDBACK
420

OBJECT DETECTION BASED ON TEXT INPUT THAT INCLUDES BOTH TARGET OBJECT CLASSES AND TARGET VISUAL ATTRIBUTES

BACKGROUND

Image classification involves applying a machine learning classifier to a digital image to predict content depicted in the digital image, e.g., as a probability of whether the image depicts a particular object class, or a probability distribution over multiple object classes. While image classification can be useful for whole-image tasks such as predicting captions, it does not usually result in individual objects being identified within the images. Object detection, by contrast, is the process by which instance(s) of object classes are detected and localized within images. These detected instances of object classes are often annotated using techniques such as bounding shapes (particularly bounding boxes), polygons, pixelwise classifications, and so forth.

SUMMARY

Zero shot and/or few shot learning improves the concepts of image classification and object detection by enabling a pretrained machine learning model to generalize over new object classes for which it has not been previously trained. In the image classification context, for instance, zero/few shot learning can be implemented to enable classification of digital images depicting new, unseen object classes. Similarly, with object detection classification, zero/few shot learning can be implemented to detect and localize instances of previously unseen objects within digital images.

Instances of a broad object class can have variable visual attributes. The broad object class of "apple" may include multiple different varietals, each having different visual characteristics (e.g., various shades of red, green, yellow, and even pink). As another example, most fruits and vegetables have different appearances depending on their ripeness, health, etc. For instance, unripe strawberries are often green and/or white, whereas ripe strawberries typically present as red. With conventional image classification and object detection, a machine learning model trained to detect "red apples" would not necessarily be able to detect "green apples" unless the model is separately trained with labeled digital images depicting green apples. More generally, different labeled training examples would be needed to train a model- or different machine learning models would need to be trained—to classify and/or detect instances of an object class having different visual attributes.

Implementations described herein for improving zero/few-shot fine-grained object classification and detection by leveraging information about visual attributes that are variable within object classes. In various implementations, an open-vocabulary object detection model architecture (OVODMA) may be pretrained to identify not only instances of target object classes, but instances of target object classes having different visual attributes (e.g., colors, shades, shapes, surface textures, etc.). Put another way, one or more training objectives may be designed or selected so that the OVODMA is trained to distinguish instance with an object class with different visual attributes. In various implementations, the OVODMA may include one or more machine learning models, such as an ensemble of machine learning models, a machine learning model with multiple different prediction heads (e.g., one for classification, another for localization), etc.

In some implementations, a method performed by one or more processors is provided that includes: obtaining a digital image that depicts at least one instance of an object class, wherein the at least one instance of the object class includes a visual attribute that is variable amongst objects of the object class; obtaining a textual snippet that includes both: one or more nouns that identify one or more target object classes, and one or more adjectives that modify the one or more nouns and describe one or more target visual attributes of the one or more target object classes; processing the textual snippet based on a text encoder to generate one or more text embeddings in a shared embedding space, each text embedding representing a respective one of the one or more target object classes and/or attributes; processing the digital image based on an image encoder to generate a plurality of image encoder output tokens; processing the image encoder output tokens based on an object classification head to generate one or more object visual embeddings in the shared embedding space; comparing the one or more text embeddings with the one or more object visual embeddings to classify one or more of the image encoder output tokens as depicting an instance of one or more of the target object classes having one or more of the target visual attributes; processing the classified one or more image encoder output tokens using a localization head to predict at least one annotation to overlay the at least one instance of the object class depicted in the digital image; and applying the at least one predicted annotation to the digital image.

In various implementations, generating the one or more object visual embeddings in the shared embedding space may include linearly projecting the one or more image encoder output tokens into the shared embedding space. In various implementations, the shared embedding space may be a shared contrastive embedding space, and the image and text encoders are pretrained contrastively.

In various implementations, processing the textual snippet based on the text encoder further generates one or more additional text embeddings, each additional text embedding representing a respective one of the one or more target visual attributes. In various implementations, the comparing may include performing the following operations separately: comparing the one or more text embeddings with the one or more object visual embeddings to classify one or more of the image encoder output tokens as depicting an instance of one or more of the target object classes; and comparing the one or more additional text embeddings with the one or more object visual embeddings to classify one or more of the image encoder output tokens as having one or more of the target visual attributes.

In various implementations, the method may further include: comparing the at least one predicted annotation with a manually adjusted annotation of the digital image to determine an error; and based on the error, training at least the object classification head and the localization head.

In various implementations, one or both of the text encoder and the image encoder may be a transformer encoder with a self-attention mechanism. In various implementations, the at least one predicted annotation may be a bounding box. In various implementations, the at least one predicted annotation may be a polygon.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4 depicts a flowchart illustrating an example method according to implementations disclosed herein.

DETAILED DESCRIPTION

Figure 1:
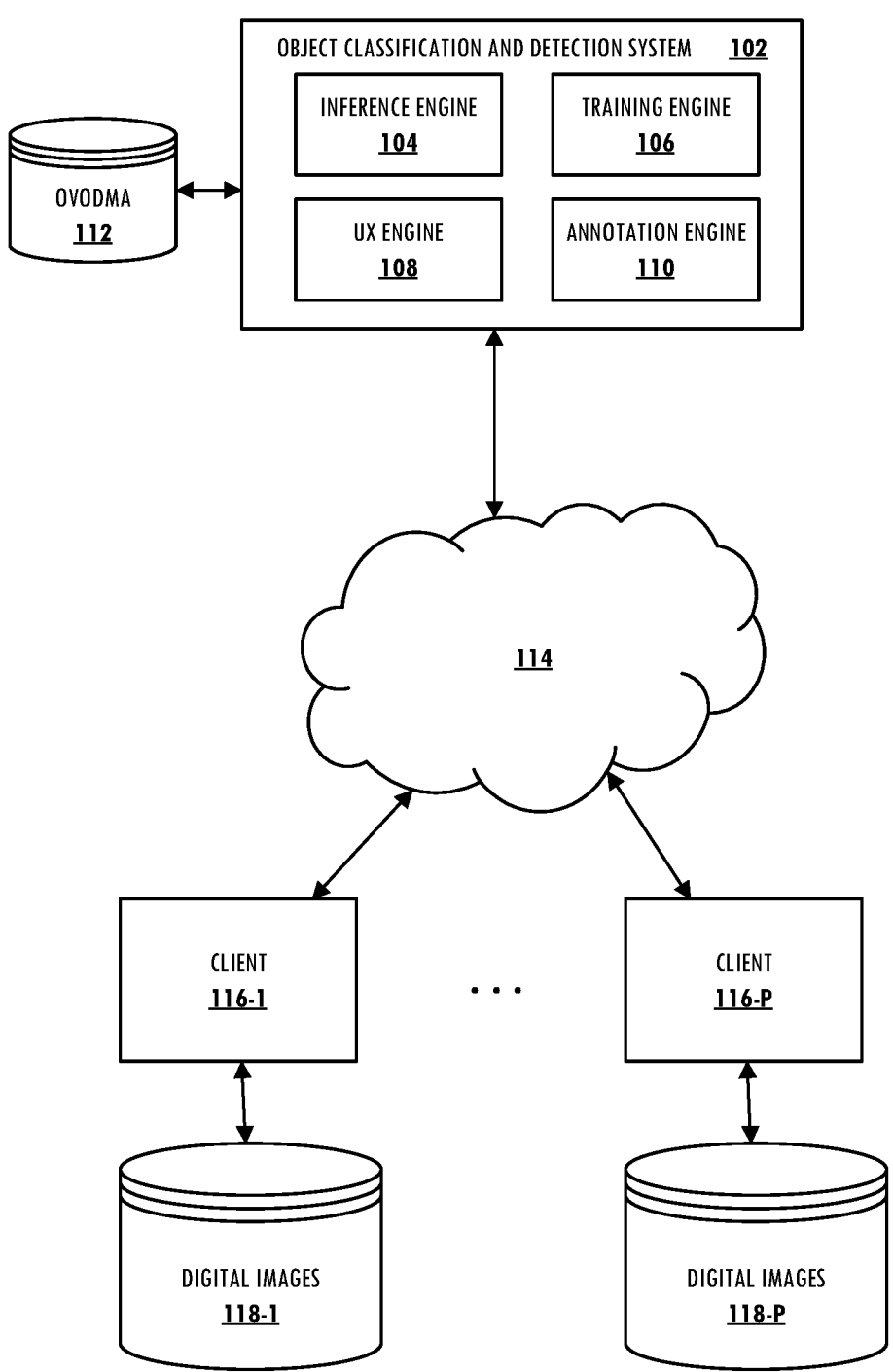
FIG. 1 schematically depicts an example environment in which selected aspects of the present disclosure may be implemented, in accordance with various implementations.

Zero shot and/or few shot learning improves the concepts of image classification and object detection by enabling a pretrained machine learning model to generalize over new object classes for which it has not been previously trained. In the image classification context, for instance, zero/few shot learning can be implemented to enable classification of digital images depicting new, unseen object classes. Similarly, with object detection classification, zero/few shot learning can be implemented to detect and localize instances of previously unseen objects within digital images.

Instances of a broad object class can have variable visual attributes. The broad object class of "apple" may include multiple different varietals, each having different visual characteristics (e.g., various shades of red, green, yellow, and even pink). As another example, most fruits and vegetables have different appearances depending on their ripeness, health, etc. For instance, unripe strawberries are often green and/or white, whereas ripe strawberries typically present as red. With conventional image classification and object detection, a machine learning model trained to detect "red apples" would not necessarily be able to detect "green apples" unless the model is separately trained with labeled digital images depicting green apples. More generally, different labeled training examples would be needed to train a model- or different machine learning models would need to be trained—to classify and/or detect instances of an object class having different visual attributes.

Implementations described herein for improving zero/few-shot fine-grained object classification and detection by leveraging information about visual attributes that are variable within object classes. In various implementations, an open-vocabulary object detection model architecture (OVODMA) may be pretrained to identify not only instances of target object classes, but instances of target object classes having different visual attributes (e.g., colors, shades, shapes, surface textures, etc.). Put another way, one or more training objectives may be designed or selected so that the OVODMA is trained to distinguish instance with an object class with different visual attributes. In various implementations, the OVODMA may include one or more machine learning models, such as an ensemble of machine learning models, a machine learning model with multiple different prediction heads (e.g., one or classification, another for localization), etc.

During inference, the OVODMA may be applied to a textual snippet (such as natural language input) that includes both noun(s) that identify target object class(es) and adjective(s) that modify the noun(s) and describe target visual attribute(s) of the target object class(es). In some cases, processing the textual snippet using the OVODMA may be said to "condition" or "prime" the OVODMA to detect particular object class(es) having particular visual attribute(s). As a working example, a user could provide a natural language input utterance such as "find all green apples." Based on this textual snippet, the OVODMA may process digital image(s) to detect instance(s) of the specified object class(es) having the specified visual attribute(s). In some implementations, bounding shape (e.g., box) locations and spatial dimensions that would surround the detected instance(s) of the specified object class(es) having the specified visual attribute(s) may be predicted and used to annotate the digital image(s). Continuing with the working example, assuming a digital image provided by the user depicts one or more red apples, those red apples may be annotated with bounding boxes, whereas instances of non-apple object classes, and even instances of apples that are not red (e.g., green), will not be annotated.

In some implementations, the OVODMA may include a text encoder and an image encoder. One or both of the text and image encoders may take various forms, such as feed forward neural networks, convolutional neural networks (CNNs), various types of transformers (e.g., with self-attention mechanisms) that are sometimes used as large language models (e.g., Bidirectional Encoder Representations from Transformers, etc.), and so forth. With the image encoder, in some implementations, an input digital image may be converted into a form, such as one or more vector representations, feature embeddings, etc., that may be organized as input tokens suitable for processing using the image encoder.

In some implementations, the text and image encoders may be pretrained using contrastive learning, such that the two encoders learn a shared "contrastive embedding space" that maps text embeddings (also referred to as "vector representations") to object visual embeddings and vice versa. Once pretrained, the text and image encoders may be used to generate, respectively, text embedding(s) and image encoder output tokens. Image encoder output tokens may correspond to, for instance, sampled spatial portions of the digital image.

In some implementations, the text encoder may be applied (during training and/or during inference) to the input textual snippet to generate text embedding(s) that correspond to the target object classes and the target visual attributes. In various implementations, these text embedding(s) may be separated; e.g., separate embedding(s) may be generated for the target object classes and the target visual attributes. In some implementations, separate embeddings may be generated for the target object classes alone, as well as for combined target object classes and target visual attributes (instead of target visual attributes alone). In either case, these separate text embeddings may be independently compared to the object visual embedding(s) to align visual attributes of object class(es) with detected instances of the object class(es). Consequently, during training, the OVODMA is trained to distinguish instances within a single object class having different visual attributes.

In various implementations, the image encoder output tokens may be processed based on an object classification head of the OVODMA to generate object visual embedding(s) in the shared contrastive embedding space. These object visual embedding(s) may be compared to the text embedding(s), e.g., using techniques such as Euclidean distance, cosine similarity, dot product, etc., to detect, in the input digital image(s), instances of object class(es) specified in the input text. The image encoder output tokens may also be processed based on a localization head of the OVODMA to predict bounding shape locations and/or spatial dimensions associated with detected instances of the target object classes having the target visual attributes. In some implementations, the object classification and localization heads of the OVODMA may be jointly trained.

Techniques described herein give rise to various technical advantages. Users will be more easily able to perform fine-grained object detection that distinguishes between instances of an object class that have different visual characteristics (e.g., a user can request that "red apples" only be annotated, leaving apples of other colors unannotated). In addition to annotating instances that match the target object class(s) and target visual attribute(s), these techniques may allow for easy modification of those detected instances. For instance, a user may request detection of all instances of "red flowers" contained on wallpaper (or otherwise drawn on a wall) that is depicted in a digital image of the wall. The user can then request that all those detected red flowers in the digital image (which may be annotated using polygon(s) and/or pixel-wise segmentation, for instance) be converted to another color, such as green. This may enable the user to see what the wallpaper would look like with green flowers, instead of red flowers.

Techniques described herein also facilitate more efficient image annotation. Manually annotating images with bounding boxes from scratch can be tedious, time-consuming, and error-prone (e.g., a fatigued annotator might miss instances of an object class depicted in an image). With techniques described herein, textual snippet may be provided that identifies both target object class(es) and target object attribute(s), and images can be at least preliminarily annotated based on those targets. These preliminarily annotated images can then be reviewed by humans, who can manually adjust the annotations (e.g., bounding boxes). These manual adjustments can, in turn, be used to continue the OVODMA's training.

As another example, in some implementations, the OVODMA can be used in reverse to generate text about images. For instance, if bounding boxes are manually drawn on particular objects in a digital image, the contents of these bounding boxes can be processed to generate object visual embeddings. These object visual embeddings may be mapped to semantically similar text embeddings in the shared contrastive learning space. Text associated with (e.g., used to generate) those semantically similar text embeddings may then be determined and provided, e.g., as a proposed object caption.

As yet another example, the text that is provided to condition or prime the OVODMA to detect instances of target object class(es) having target visual attribute(s) can include entire documents. For instance, an encyclopedia page describing a particular apple varietal, including its various visual characteristics, may be processed as textual input for the OVODMA. Consequently, the OVODMA may be conditions to detect instances of the apple varietal within digital image(s), e.g., to the exclusion of other apple varietals.

FIG. 1 schematically depicts an example environment in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs", tensor processing units or "TPUs") that execute computer-readable instructions stored in memory, or other types of logic such as application-specific integrated circuits ("ASIC"), field-programmable gate arrays ("FPGA"), and so forth. Some of the systems depicted in FIG. 1, such as an object classification and detection system 102, may be implemented using one or more server computing devices that form what is sometimes referred to as a "cloud infrastructure," although this is not required.

Object classification and detection system 102 may include one or more computing systems that cooperate and/or coordinate to practice selected aspects of the present disclosure. In some implementations, object classification and detection system 102 may be implemented in what is often referred to as "cloud" infrastructure, or simply the "cloud," but this is not required. One or more client devices 116-1, . . . , 116-P may be communicatively coupled with object classification and detection system 102 via one or more networks 114, such as one or local area networks (LANs) and/or one or more wide area networks such as the Internet.

An individual (which in the current context may also be referred to as a "user") may operate a client device 116-1, . . . , 116-P to interact with other components depicted in FIG. 1. Each client device 116-1, . . . , 116-P may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") that provides an AR or VR immersive computing experience, a "smart" watch, and so forth. Additional and/or alternative client devices may be provided.

Object classification and detection system 102 may include a variety of engines configured to carry out selected aspects of the present disclosure. These engines, which may be implemented using any combination of hardware and software, may include, for instance, an inference engine 104, a training engine 106, a user interface (UX) engine 108, and an annotation engine 110. In various implementations, one or more of engines 104-110 may be combined with other engines, omitted, and/or implemented elsewhere. For instance, in various implementations, any of engines 104-110 (or object classification and detection system 102 as a whole) may be implemented in whole or in part on client devices 116-1, . . . , 116-P. In this way, a user may be able to detect and/or annotate instances of target object classes having target visual attributes in digital images at the "edge," e.g., while offline.

Inference engine 104 may be configured to apply multiple modalities of data, such as digital images (individual images or video frames) and textual data, as input across one or more machine learning models. Based on application of data, inference engine 104 may classify entire images as depicting target object classes identified in the textual snippet and/or to detect instances of target object classes within the digital images, e.g., for purposes of annotation, tallying object class instances, etc. For example, inference engine 104 may generate predictions of whether (e.g., probability) individual image encoder output tokens, which may represent spatial portions of digital images, contain an instance of a target object class having a target visual attribute (e.g., a "red apple"). Additionally, inference engine 104 may predict where in a digital image annotations such as bounding boxes, polygons, pixelwise annotations, etc., should be located/inserted/overlaid, so that those image encoder output tokens that depict instances of target object class(es) having target visual attribute(s) are annotated as accurately as possible.

The textual snippet applied by inference engine 104 may take various forms. In some implementations, a user operating a client device 116 may provide a natural language input that identifies target object class(es) and target visual attribute(s) within those target object class(es) that the user wants classified and/or detected. The user may type this natural language input, or may speak it, in which case speech-to-text (STT) processing may be performed to predict, as the textual snippet to be applied by inference engine 104, speech recognition output of the user. In some implementations, the textual snippet may be obtained from documents such as scientific articles, online encyclopedia entries, or other educational and/or commercial documents. Whichever the case, the textual snippet may include both: noun(s) that identify target object class(es) sought by the user; and adjective(s) that modify the noun(s) and describe target visual attribute(s) of the target object class(es) that are sought by the user.

In various implementations, the machine learning model(s) applied by inference engine 104 may be provided as an open-vocabulary object detection model architecture (OVODMA) indicated at 112. OVODMA 112 may include a variety of different types of machine learning models, layers, and/or prediction heads that may be trained to perform a variety of different functions and/or to cooperate with other components of OVODMA 112. These models may include, but are not limited to, feed forward neural networks (e.g., used as prediction heads), CNNs, recurrent neural networks (e.g., LSTMs, GRUs), support vector machines, decision trees, various types of transformers having self-attention mechanisms (e.g., BERT), and so forth. More details about how OVODMA 112 may be implemented are provided in subsequent figures.

Training engine 106 may be configured to pretrain, fine-tune, and/or continue training of various model(s) forming part of OVODMA 112. In some implementations, training engine 106 may pretrain multiple modalities of encoders to encode different modalities of data into shared embedding spaces. In some such implementations, this pretraining may be contrastive, e.g., using techniques such as random initialization with a contrastive loss on text and image representations, triplet loss, etc. Consequently, the shared embedding space may also be referred to as a shared contrastive embedding space. Training engine 106 may also train prediction heads, such as a classification prediction head and a localization prediction head that will be discussed in more detail with regard to subsequent figures.

UX engine 108 may be configured to provide an interface, such as an application programming interface (API) or similar, through which a user that operates a client device 116 can interact with object classification and detection system 102 to carry out selected aspects of the present disclosure. For example, UX engine 108 may provide an interface for an application (not depicted, e.g., a proprietary/standalone application or a web browser) executing on a client device 116 to request classification and/or detection of instances of target object class(es) having target visual attribute(s).

Annotation engine 110 may be configured to modify digital images in which instances of target object class(es) having target visual attribute(s) are detected. For example, annotation engine 110 may receive predicted classifications and/or annotations from inference engine 104. Based on these predicted classifications and/or annotations, annotation engine may modify the digital image, e.g., by altering and/or replacing individual pixels, overlaying over pixels, etc., such that the resulted annotated digital image calls out detected instances of target object class(es) having target visual attribute(s).

Figure 2:
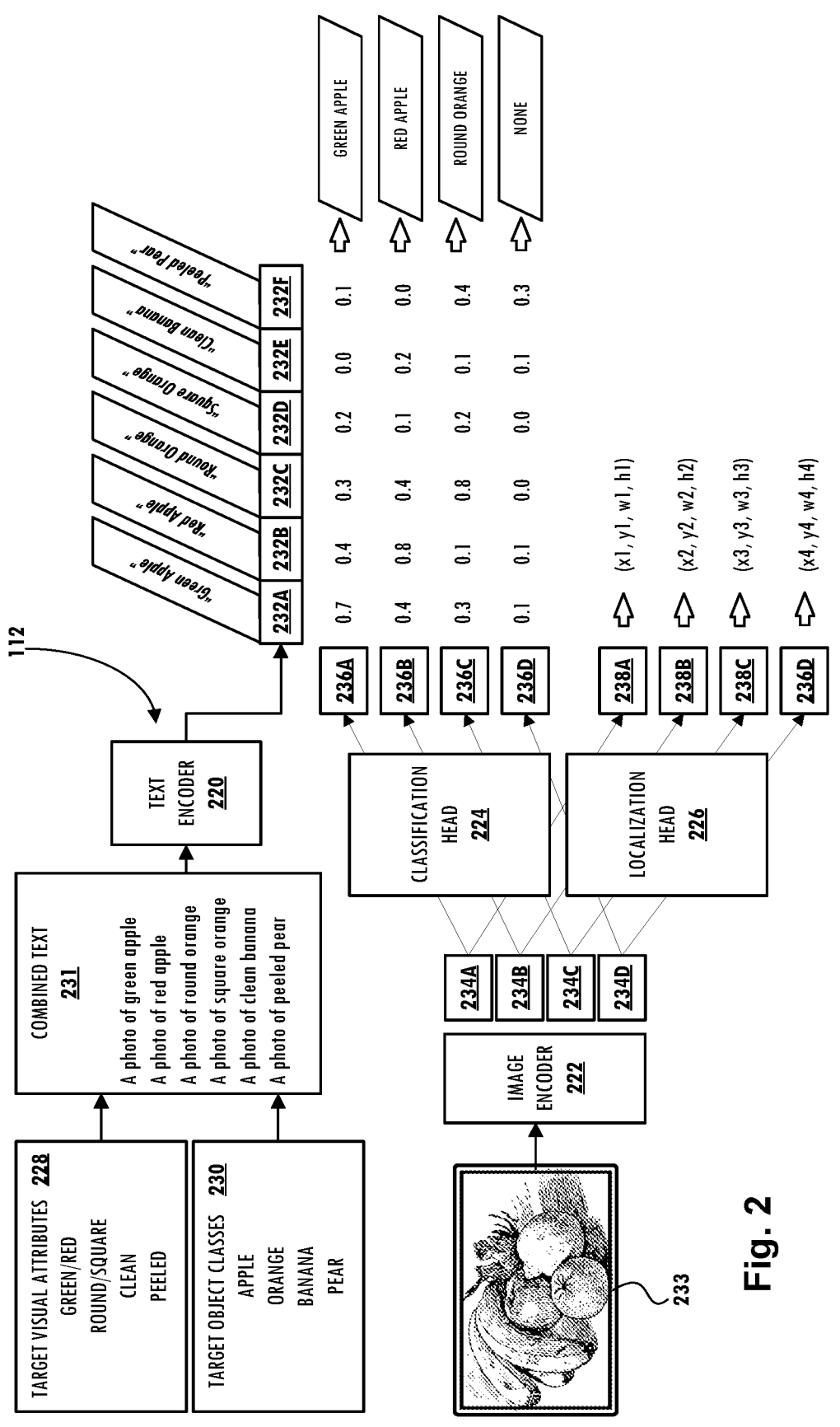
FIG. 2 is a block diagram of an example process flow configured with selected aspects of the present disclosure.

FIG. 2 schematically depicts one example of OVODMA 112 configured with selected aspects of the present disclosure. OVODMA 112 includes a text encoder 220, an image encoder 222, a classification head 224 and a localization head 226. Elements 220-226 may or may not be part of a single machine learning model or an ensemble of machine learning models. Operation of OVODMA 112 begins at top left, where one or more target visual attributes 228 are provided by a user, e.g., as adjectives that modify one or more nouns identifying one or more target object classes 230 (which may be provided as combined text 231 in some implementations). In FIG. 2, for instance, the target visual attributes 228 include "green," "red," "round," "square," "clean," and "peeled." The target object classes 230 include "apple," "orange," "banana," and "pear." While shown as separate components in FIG. 2, in many cases, these target visual attributes and objects may be provided as one or more statements or queries, such as "A photo of a green apple," "A photo of a round orange," and so forth.

Target visual attributes 228 and target object classes 230 may be processed, e.g., by inference engine 104 (not depicted in FIG. 2) based on text encoder 220 to generate one or more embeddings 232A-232F. Six embeddings 232A-232F are depicted in FIG. 2 for illustrative purposes only and are not meant to be limiting. Embeddings 232A-232F may be, for instance, continuous vector representations.

Meanwhile, a digital image 233 provided in conjunction with (e.g., at the same time, contemporaneously with) inputs 228 and 230 may be processed, e.g., by inference engine 104 using image encoder 222 to generate a plurality of image encoder output tokens 234A, 234B, 234C, 234D. While four image encoder output tokens 234A, 234B, 234C, 234D are depicted in FIG. 2, this is only meant for illustrative purposes and is not meant to be limiting. Each of the image encoder output tokens 234A, 234B, 234C, 234D may correspond to, for instance, a spatial portion (e.g., patch) of digital image 233.

In various implementations, inference engine 104 may apply image encoder output tokens 234A, 234B, 234C, 234D as inputs across one or more prediction heads to generate various predictions. In FIG. 2, for instance, inference engine 104 may apply image encoder output tokens 234A, 234B, 234C, 234D as inputs across classification head 224 to generate object visual embeddings 236A, 236B, 236C, 236D. Four object visual embeddings are depicted in FIG. 2 for illustrative purposes only and are not meant to be limiting. The number of image encoder output tokens and/or object visual embeddings may be dictated by factors such as the size of the input image, the size of patches used as the image encoder output tokens, and so forth. For example, suppose an image has a size of (or is resized to) 840×840×3 (height*width*channel), and that a patch size of 14×14×3 is used to split the 840×840×3 image to multiple 14×14×3 patches without overlapping. This will result in 3600 patches ((840/14)*(840/14)=3600).

Once embeddings 232A-F and 236A-D are generated, they may be compared, e.g., by inference engine 104. Based on this comparison, inference engine 104 may classify each object visual embedding into a target object class and target visual attribute represented by one of embeddings 232A-F. In FIG. 2, for instance, first object visual embedding 236A is compared to text embeddings 232 to determine that first text embedding 232A (which may represent "green apple", for instance) is the most similar (e.g., using cosine similarity, Euclidean distance, etc.) with a similarity measure of 0.7. Because 0.7 is the greatest value generated when comparing first object visual embedding 236A to text embeddings 232A-F, and because 0.7 appears to satisfy some minimum similarity threshold, first object visual embedding 236A is classified as a "green apple" to the right. Intuitively, this means image encoder output token(s) 234 that were used to generate the first object visual embedding 236A collectively portray a green apple.

More examples of this can be seen in FIG. 2. Assuming second text embedding 232B represents "red apple," and that second object visual embedding 236B represents image encoder output token(s) of digital image 233 that depict a red apple, second object visual embedding 236B is classified (based on a 0.8 similarity measure) as a "red apple." Similarly, assuming third text embedding 232C represents "round orange," and that third object visual embedding 236C represents image encoder output token(s) of digital image 233 that depict a round orange, third object visual embedding 236C is classified (based on a 0.8 similarity measure) as a "round orange."

If an object visual embedding 236 is not sufficiently similar to any of the text embeddings 232A-F in the shared embedding space, it may be the case that the image encoder output token(s) used to generate that object visual embedding do not depict any target object class, at least not with sufficient confidence. In FIG. 2, for instance, fourth object visual embedding 236D is not particularly similar to any of text embeddings 232A-F (the greatest similarity score is 0.3). Consequently, fourth object visual embedding (and the image encoder output token(s) used to generate it) may be classified as "inconclusive" or "none."

Image encoder output tokens 234A-D may also be processed, e.g., by inference engine 104, using localization head 226. Localization head 226 may generate location representations 238A-D that represent and/or correspond to locations in digital image 233 that depict instances of target object class(es) having target visual attribute(s). In FIG. 2, for instance, location representations 238A-D represent locations and spatial dimensions of bounding boxes that surround, for instance, all possible objects depicted in image 233, and/or detected instances of target object class(es) having target visual attribute(s).

With the configuration of OVODMA 112 depicted in FIG. 2, target object class(es) and target visual attribute(s) are processed together to generate joint embeddings 232A that represent both object and visual attributes. In various implementations, aspects of OVODMA 112 may be trained, e.g., by training engine 106 (not depicted in FIG. 2), in various ways. For example, text encoder 220 and image encoder 222 may be trained, e.g., by training engine 106, using contrastive learning to learn a shared contrastive embedding space in which text embeddings 232A-F and object visual embeddings 236A-D can be readily compared for semantic similarity (e.g., using Euclidean distance, cosine similarity, etc.).

Additionally, training engine 106 may jointly train classification head 224 and localization head 226 based on feedback received in response to classifications generated by classification head 224 and/or annotations predicted by localization head 226. For example, once annotation engine 110 applies the annotations predicted by localization head 226 to digital image 233, a user may be presented with the annotated digital image 233. The user may have an opportunity to add missing annotations, adjust existing annotations, and so forth. Based on these user operations to improve the annotations, which may constitute the aforementioned feedback, training engine 106 may determine errors, and may jointly train classification head 224 and localization head 226, e.g., using techniques such as gradient descent, back propagation, cross entropy, etc. In some implementations, classification head 224 may be trained, e.g., by training engine 106, using a linear combination of a negative log-likelihood. In some implementations, localization head 226 may be trained, e.g., by training engine 106, using a linear combination of L1 loss and generalized Intersection-over-Union (IOU) loss.

Figure 3:
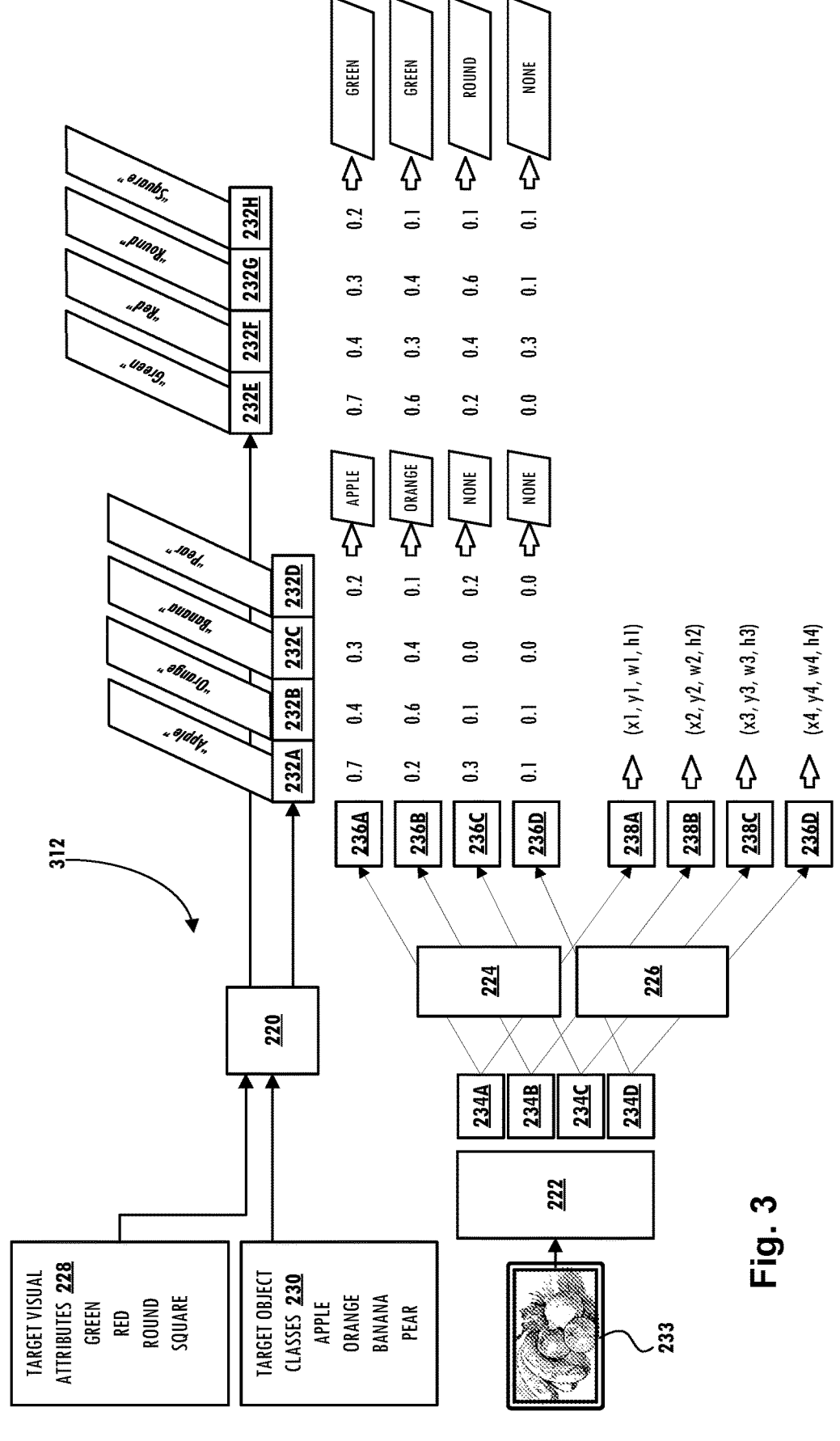
FIG. 3 is a block diagram of another example process flow configured with selected aspects of the present disclosure.

FIG. 3 depicts a variation of an OVODMA 312 in which many components are similar to OVODMA 112 in FIG. 2, and thus will not be discussed in detail again. However, a difference between OVODMA 312 and OVODMA 112 is that the former (depicted in FIG. 3) is designed and trained to facilitate separate consideration, e.g., by inference engine 104, of target object class(es) and target visual attribute(s). In FIG. 3, text encoder 220 is now configured to generate one set of text embedding(s) 232A-D for target object classes 230 and another set of text embeddings 232E-H for target visual attributes 228 (which may also be encoded with target object classes in some instances).

Object visual embeddings 236A-D are once again compared to text embeddings 232A-D to generate first classifications ("apple," "orange," "none," "none"). Object visual embeddings 236A-D are also separately compared to additional text embeddings 232E-H to generate second classifications of visual attributes ("green," "green," "round," "none"). In some implementations, the separate similarity measures generated, e.g., by inference engine 104, for each object visual embedding 236 may be combined (e.g., averaged, concatenated) to yield an aggregate embedding that may ultimately dictate how the respective object visual embedding 236 is classified. By separately considering target object class(es) and target visual attribute(s) as shown in FIG. 3, OVODMA 312 becomes highly capable of distinguishing instances within a single object class based on variable visual attributes.

FIG. 4 is a flowchart illustrating an example method 400 of practicing selected aspects of the present disclosure, in accordance with implementations disclosed herein. For convenience, the operations of the flow chart are described with reference to a system that performs the operations. This system may include various components of various computer systems, such as one or more components of object classification and detection system 102. Moreover, while operations of method 400 are shown in a particular order, this is not meant to be limiting. One or more operations may be reordered, omitted or added.

At block 402, the system, e.g., by way of UX engine 108 from a client device 116 operated by a user, may obtain a digital image (e.g., 233). The digital image may depict at least one instance of an object class, and instance(s) of the object class may include a visual attribute that is variable amongst objects of the object class. For example, the object class could be "apple," and the visual attribute might be "green," whereas other colored apples are possible, such as red, pink, yellow, etc.

At block 404, the system, e.g., by way of UX engine 108 from client device 116, may obtain a textual snippet that includes both: noun(s) that identify target object class(es); and adjective(s) that modify the noun(s) and describe target visual attribute(s) of the target object class(es). In some implementations, the textual snippet may be provided by a user of client device 116, e.g., as typed or spoken (and then processed using STT) text delivered at a command line, via a microphone, etc. Additionally or alternatively, the textual snippet may be an entire document that describes target object class(es) and target visual attribute(s) of the target object class(es). For example, the textual snippet may be an online encyclopedia entry that describes a particular species or genus of melon, and variations of visual attributes (e.g., colors, shapes, surface textures) that may be found within that species/genus of melon.

At block 406, the system, e.g., by way of inference engine 104, may process the textual snippet based on a text encoder (e.g., 220) to generate text embeddings (e.g., 232A-H) in a shared embedding space. In various implementations, each text embedding may represent a respective one of the target object classes identified in the textual snippet and/or a respective one of the target visual attributes identified in the textual snippet.

At block 408, the system, e.g., by way of inference engine 104, may process the digital image based on an image encoder (e.g., 222) to generate a plurality of image encoder output tokens (e.g., 234A-D). At block 410, the system, e.g., by way of inference engine 104, may process the image encoder output tokens based on an object classification head (e.g., 224) to generate what will be referred to herein as "object visual" embedding(s) (e.g., 236A-D) in the shared embedding space.

At block 412, the system, e.g., by way of inference engine 104, may compare the one or more text embeddings with the one or more object visual embeddings to classify one or more of the image encoder output tokens as depicting an instance of one or more of the target object classes having one or more of the target visual attributes. For instance, inference engine 104 may use techniques such as Euclidean distance, cosine similarity, dot product, etc. to determine similarity measures of text embeddings and object visual embeddings in the shared contrastive embedding space.

At block 414, the system, e.g., by way of inference engine 104, may process the classified one or more image encoder output tokens using a localization head (e.g., 226) to predict at least one annotation to overlay the at least one instance of the object class depicted in the digital image.

At block 416, the system, e.g., by way of annotation engine 110, may apply the predicted annotation(s) to the digital image. For example, annotation engine 110 may add, overlay, and/or project bounding shapes (e.g., boxes), polygons, and/or pixel-wise classifications to the digital image.

Blocks 418-420 may be performed, e.g., by training engine 106, during training and/or onwards to continue training of OVODMA 112/312. At block 418, the system, e.g., by way of UX engine 108, may receive feedback about the annotations applied by annotation engine 110 at block 416. For example, a user may resize and/or move a bounding shape to more accurately surround a detected instance of a target object class having a target visual attribute. Based on this feedback, at block 420, the system, e.g., by way of training engine 106, may train one or more layers and/or aspects of the OVODMA, e.g., using techniques such as gradient descent, back propagation, cross entropy, etc.

Figure 5:
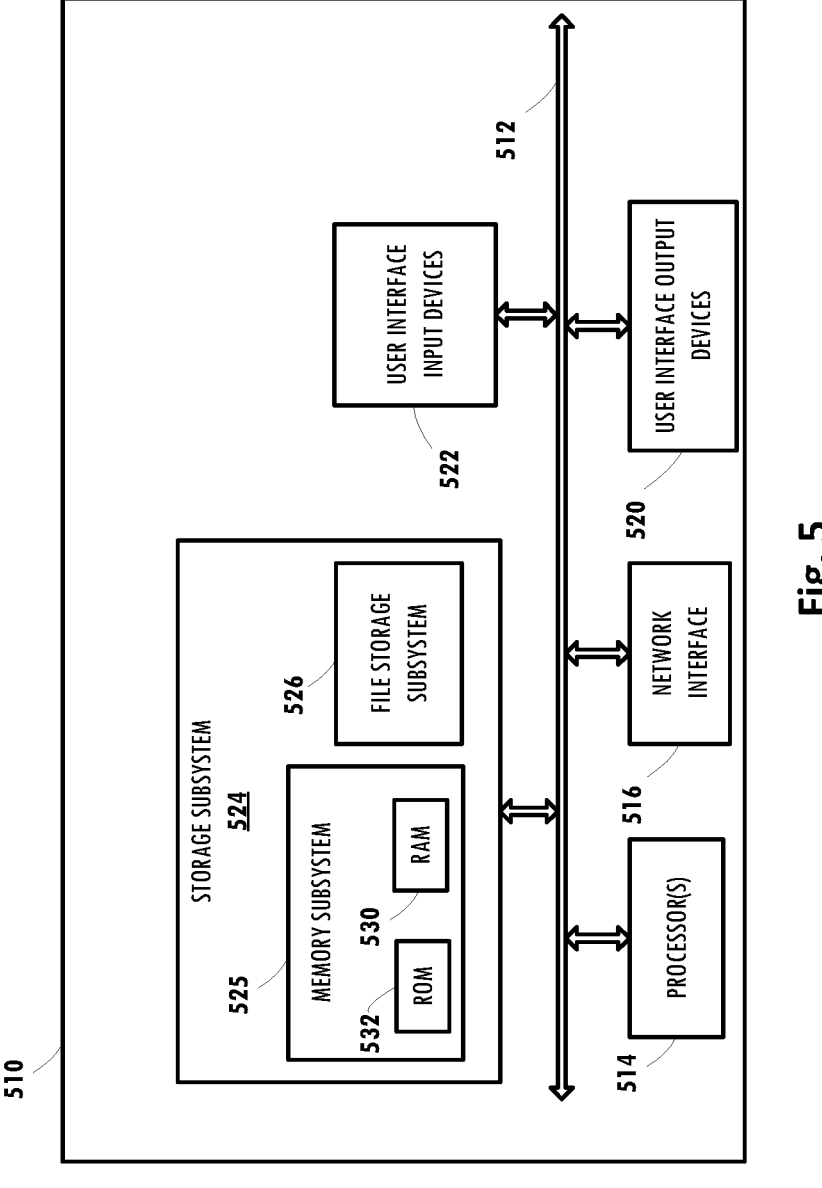
FIG. 5 illustrates an example architecture of a computing device.

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the engines or modules described herein. For example, the storage subsystem 524 may include the logic to perform selected aspects of the method of FIG. 4, as well as to implement various components depicted in FIGS. 1-3.

These software engines or modules are generally executed by processor 514 alone or in combination with other processors. Memory 525 used in the storage subsystem 524 can include a number of memories including a main random-access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The engines or modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple buses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors and comprising:

obtaining a digital image that depicts at least one instance of an agricultural object class of a plurality of agricultural object classes, wherein the at least one instance of the agricultural object class includes a physical attribute of a plurality of physical attributes that is variable amongst objects of the agricultural object class, wherein the plurality of physical attributes includes a ripeness or a health condition of the agricultural object class;

obtaining a textual snippet that includes both:

one or more nouns that identify one or more agricultural object classes of the plurality, and one or more adjectives that modify the one or more nouns, the one or more adjectives describing one or more physical visual attributes of the plurality for the one or more agricultural object classes, wherein the described physical visual attributes include the ripeness or the health condition;

determining the physical attribute for the instance of the agricultural object class depicted in the digital image, the determination comprising:

generating, using a text encoder, one or more text embeddings in a shared embedding space, each text embedding representing the one or more agricultural object classes and one or more target physical attributes depicted in the digital image;

generating, using an image encoder on the digital image, a plurality of image encoder output tokens;

generating, using an object classification model on the plurality of image encoder output tokens, one or more object visual embeddings in the shared embedding space;

comparing the one or more text embeddings in the shared embedding space with the one or more object visual embeddings in the shared embedding space;

classifying, based on the comparison, one or more of the image encoder output tokens as depicting the instance of the agricultural object class and the physical attribute for the agricultural object class, wherein the physical attribute includes the ripeness or the health condition;

determining, based on the one or more image encoder output tokens classified as depicting the physical attribute for the instance of the agricultural object class in the digital image, an annotation to overlay the instance of the agricultural object class depicted in the digital image; and applying the at least one determined annotation to the digital image describing the ripeness or the health condition of the identified instance of the agricultural object class in the digital image.

2. The method of claim 1, wherein generating the one or more object visual embeddings in the shared embedding space includes linearly projecting the one or more image encoder output tokens into the shared embedding space.

3. The method of claim 1, wherein the shared embedding space is a shared contrastive embedding space, and the image and text encoders are pretrained contrastively.

4. The method of claim 1, wherein processing the textual snippet based on the text encoder further generates one or more additional text embeddings, each additional text embedding representing a respective one of the one or more target visual attributes.

5. The method of claim 4, wherein the comparing comprises performing the following operations separately:

comparing the one or more text embeddings with the one or more object visual embeddings to classify one or more of the image encoder output tokens as depicting an instance of one or more of the target object classes; and comparing the one or more additional text embeddings with the one or more object visual embeddings to classify one or more of the image encoder output tokens as having one or more of the target visual attributes.

6. The method of claim 1, further comprising:

comparing the determined annotation with a manually adjusted annotation of the digital image to determine an error; and based on the error, training at least the object classification model.

7. The method of claim 1, wherein one or both of the text encoder and the image encoder comprises a transformer encoder with a self-attention mechanism.

8. The method of claim 1, wherein the determined annotation comprises a bounding box.

9. The method of claim 1, wherein the determined annotation comprises a polygon.

10. A system comprising one or more processors and memory storing instructions that, in response to execution by the one or more processors, cause the one or more processors to:

obtain a digital image that depicts at least one instance of an agricultural object class of a plurality of agricultural object classes, wherein the at least one instance of the agricultural object class includes a physical attribute of a plurality of physical attributes that is variable amongst objects of the agricultural object class, wherein the plurality of physical attributes includes a ripeness or a health condition of the agricultural object class;

obtain a textual snippet that includes both:

one or more nouns that identify one or more agricultural object classes of the plurality, and one or more adjectives that modify the one or more nouns, the one or more adjectives describing one or more physical visual attributes of the plurality for the one or more agricultural object classes, wherein the described physical visual attributes include the ripeness or the health condition;

determine the physical attribute for the instance of the agricultural object class depicted in the digital image, the determination causing the one or more processors to:

generate, using a text encoder, one or more text embeddings in a shared embedding space, each text embedding representing the one or more agricultural object classes and one or more target physical attributes depicted in the digital image;

generate, using an image encoder on the digital image, a plurality of image encoder output tokens;

generate, using an object classification model on the plurality of image encoder output tokens, one or more object visual embeddings in the shared embedding space;

compare the one or more text embeddings in the shared embedding space with the one or more object visual embeddings in the shared embedding space;

classify, based on the comparison, one or more of the image encoder output tokens as depicting the instance of the agricultural object class and the physical attribute for the agricultural object class, wherein the physical attribute includes the ripeness or the health condition;

determine, based on the one or more image encoder output tokens classified as depicting the physical attribute for the instance of the agricultural object class in the digital image, an annotation to overlay the instance of the agricultural object class depicted in the digital image; and apply the at least one determined annotation to the digital image describing the ripeness or the health condition of the identified instance of the agricultural object class in the digital image.

11. The system of claim 10, wherein the instructions to generate the one or more object visual embeddings in the shared embedding space include instructions to linearly project the one or more image encoder output tokens into the shared embedding space.

12. The system of claim 10, wherein the shared embedding space is a shared contrastive embedding space, and the image and text encoders are pretrained contrastively.

13. The system of claim 10, wherein processing the textual snippet based on the text encoder further generates one or more additional text embeddings, each additional text embedding representing a respective one of the one or more target visual attributes.

14. The system of claim 13, wherein the instructions to compare include instructions to separately:

compare the one or more text embeddings with the one or more object visual embeddings to classify one or more of the image encoder output tokens as depicting an instance of one or more of the target object classes; and compare the one or more additional text embeddings with the one or more object visual embeddings to classify one or more of the image encoder output tokens as having one or more of the target visual attributes.

15. The system of claim 10, further comprising instructions to:

compare the determined annotation with a manually adjusted annotation of the digital image to determine an error; and based on the error, training at least the object classification model.

16. The system of claim 10, wherein one or both of the text encoder and the image encoder comprises a transformer encoder with a self-attention mechanism.

17. The system of claim 10, wherein the determined annotation comprises a bounding box.

18. The system of claim 10, wherein the determined annotation comprises a polygon.

19. At least one non-transitory computer-readable medium comprising instructions that, when executed by one or more processors, cause the one or more processors to:

obtain a digital image that depicts at least one instance of an agricultural object class of a plurality of agricultural object classes, wherein the at least one instance of the agricultural object class includes a physical attribute of a plurality of physical attributes that is variable amongst objects of the agricultural object class, wherein the plurality of physical attributes includes a ripeness or a health condition of the agricultural object class;

obtain a textual snippet that includes both:

one or more nouns that identify one or more agricultural object classes of the plurality, and one or more adjectives that modify the one or more nouns, the one or more adjectives describing one or more physical visual attributes of the plurality for the one or more agricultural object classes, wherein the described physical visual attributes include the ripeness or the health condition;

determine the physical attribute for the instance of the agricultural object class depicted in the digital image, the determination causing the one or more processors to:

genearte, using a text encoder, one or more text embeddings in a shared embedding space, each text embedding representing the one or more agricultural object classes and one or more target physical attributes depicted in the digital image;

generate, using an image encoder on the digital image, a plurality of image encoder output tokens;

generate, using an object classification model on the plurality of image encoder output tokens, one or more object visual embeddings in the shared embedding space;

compare the one or more text embeddings in the shared embedding space with the one or more object visual embeddings in the shared embedding space;

classify, based on the comparison, one or more of the image encoder output tokens as depicting the instance of the agricultural object class and the physical attribute for the agricultural object class, wherein the physical attribute includes the ripeness or the health condition;

determine, based on the one or more image encoder output tokens classified as depicting the physical attribute for the instance of the agricultural object class in the digital image, an annotation to overlay the instance of the agricultural object class depicted in the digital image; and apply the at least one determined annotation to the digital image describing the ripeness or the health condition of the identified instance of the agricultural object class in the digital image.

20. The at least one non-transitory computer-readable medium of claim 19, wherein generating the one or more object visual embeddings in the shared embedding space includes linearly projecting the one or more image encoder output tokens into the shared embedding space.

* * * * *